United States Patent [19]
Locklin

[11] 3,838,882
[45] Oct. 1, 1974

[54] REAR ACCESS PANEL FOR A MOTOR HOME

[75] Inventor: John G. Locklin, West Bloomfield, Mich.

[73] Assignee: General Motors Corporation, Detroit, Mich.

[22] Filed: Apr. 12, 1973

[21] Appl. No.: 350,312

[52] U.S. Cl............ 296/53, 49/463, 49/483, 52/476, 220/46 R, 220/81 R
[51] Int. Cl............................................ B60j 5/10
[58] Field of Search.............. 296/23 R, 50, 53, 106; 49/463, 483, 488, 465; 52/475, 476; 220/46 R, 81

[56] References Cited
UNITED STATES PATENTS

| | | | |
|---|---|---|---|
| 1,567,876 | 12/1925 | Turner | 296/23 R |
| 1,841,991 | 1/1932 | Thompson | 296/23 R |
| 2,392,835 | 1/1946 | Conlon | 49/463 X |
| 3,440,779 | 4/1969 | Helma | 52/475 X |
| 3,491,486 | 1/1970 | Caruth | 52/476 X |
| 3,589,070 | 6/1971 | Hansen | 49/483 |

Primary Examiner—Robert J. Spar
Assistant Examiner—Leslie J. Paperner
Attorney, Agent, or Firm—Herbert Furman

[57] ABSTRACT

An opening is provided in the rear of a motor home body to facilitate the installation of furnishings therein. The opening is defined by fiber glass roof, pillar and sill body members. These body members cooperatively provide a U-shaped flange structure having a continuous recess which opens outwardly of the body and receives a continuous tubular seal. The inboard leg of the flange structure has notches spaced along its periphery. A closure panel for the opening has a plurality of lateral extending stiffening flanges, with the outermost flange being receivable within the recess for sealingly engaging the tubular seal. Spaced projections on panel interengage with the notches to positively locate the panel against movement within the plane of the body opening. A plurality of removable fasteners removably attach the panel to the motor home body.

1 Claim, 4 Drawing Figures

PATENTED OCT 1 1974
3,838,882
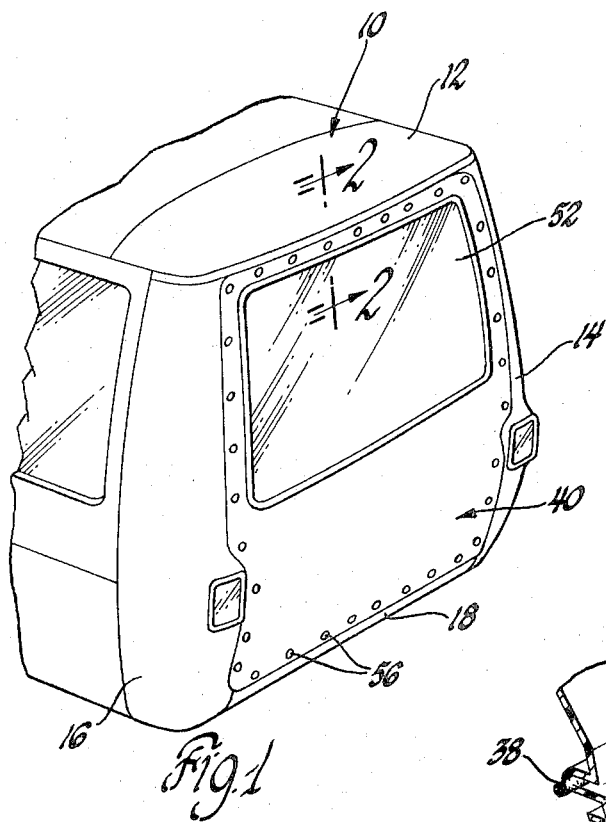
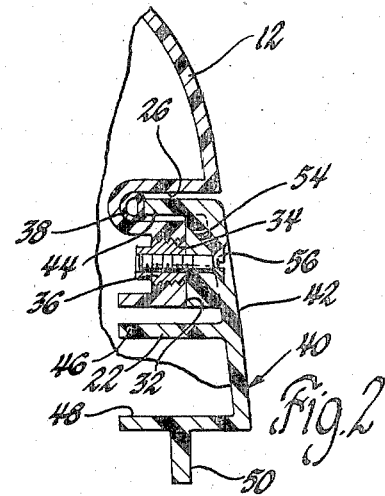
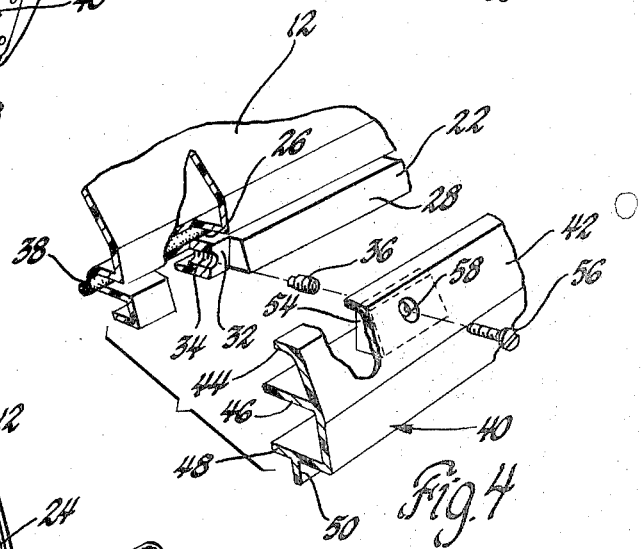
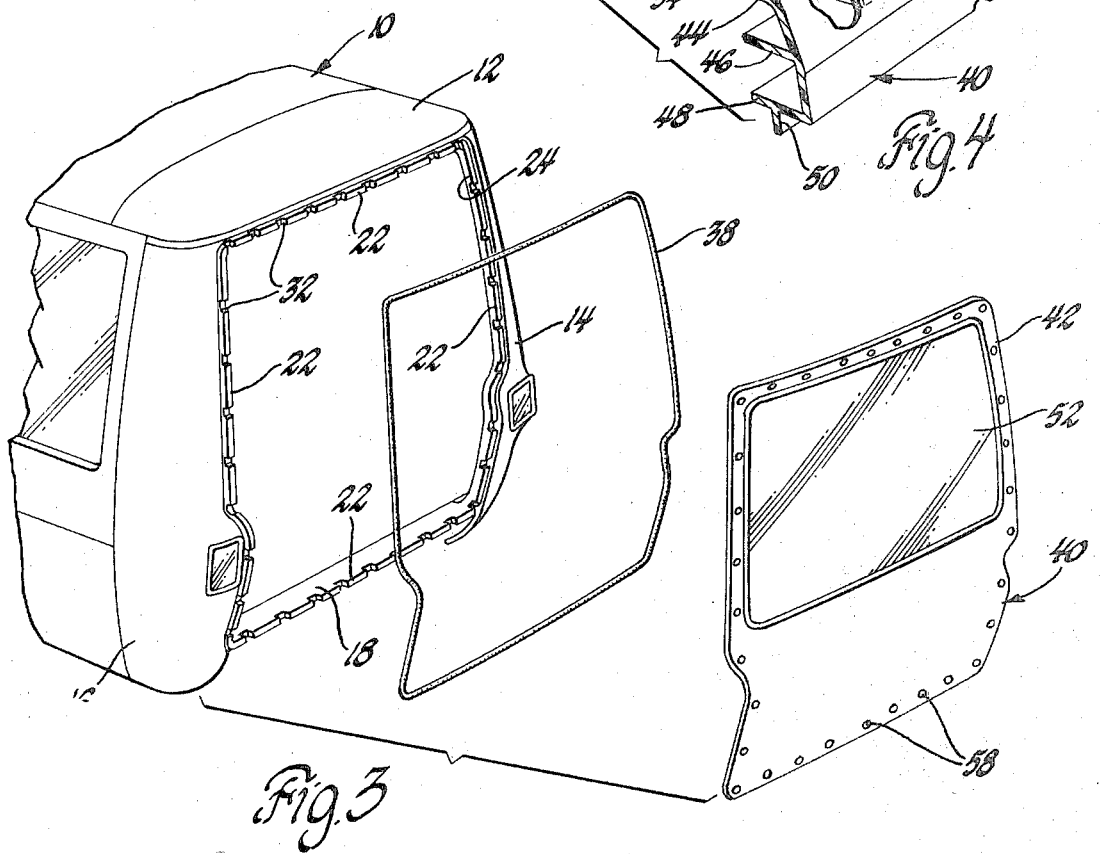

3,838,882

REAR ACCESS PANEL FOR A MOTOR HOME

The invention relates to a motor home and more particularly to a removable rear access panel for a motor home body.

Motor homes are well known and typically include an enclosed vehicle body mounted on a vehicle chassis. Such motor homes have a door through which ingress and egress may be had into the motor home body. The interior of the motor home body is typically equipped with various furnishings such as a bathroom and kitchen appliances, as well as a sofa and a dinette which typically convert into beds.

Heretofore it has been commonplace to construct these furnishings within the motor home by carrying various components and materials through the door of the motor home or in some instances by lifting such components and materials through the window openings before the window glass is installed. These prior art motor homes also have the disadvantage of requiring the dismantling of these furnishings as may be required for maintenance and/or refurbishing of the motor home interior.

It is desirable in motor homes to employ modern mass production techniques for construction of the various furnishings for the motor home interior and to preassemble such furnishings in modules which may be easily and quickly installed within the motor home body as well as easily removed for maintenance or rearrangement within the motor home to provide a modified floor plan. Application of these techniques has heretofore been limited by the size of the door opening of the motor home through which the furnishing modules must be carried.

The present invention provides a removable panel for a rear access opening in the motor home body which facilitates outfitting of the interior of the motor home with the various furnishing modules as well as providing ease of access to the motor home interior as may be required for maintenance or refurbishing thereof.

One feature of the present invention is a provision of a motor home having a rear body opening closed by a semipermanently fastened removable fiber glass panel.

Another feature of the invention is the provision of the removable access panel for a motor home body having a watertight sealing arrangement.

A further feature of the invention is the provision of interengaging projections and notches on a fiber glass closure panel and the various fiber glass body members defining an opening in a motor home body to positively locate the closure panel in the body opening and thereby minimize the possibility of stress cracking of the fiber glass closure.

According to the invention a rear opening is provided in a motor home body and is defined by fiber glass body members including a roof header member, a sill member, and side pillar members. Each of these body members has a U-shaped flange structure thereon which provides a recess opening outwardly and rearwardly of the vehicle. The flange structure also has a portion of thickened cross section located inboard of the recess and having notches spaced along its length. A continuous tubular seal of compressible material is inserted in the recess provided by the flange structure of the various body members. The panel for closure of the rear opening has a plurality of stiffening flanges thereon extending laterally of the panel and inwardly of the body with the outermost thereof being receivable within the recess for sealingly engaging the tubular seal. Projections are provided at spaced intervals along the flange structure of the panel and are interengaged with the notches in the flange structure of the body members to positively locate the closure panel against movement within the plane of the body opening. Nut inserts are threadedly received in holes in the body member flange structure within the notches and in turn receive screws inserted through aligned holes in the projections of the filler panel flange structure to removably attach the panel to the motor home body.

In the drawings:

FIG. 1 is a perspective view of the rear end of a motor home embodying the invention;

FIG. 2 is a sectional view taken in the direction of arrows 2—2 of FIG. 1;

FIG. 3 is an exploded perspective view of the rear end of the motor home; and

FIG. 4 is an enlarged fragmentary exploded view.

Referring to FIGS. 1 and 3, the rear portion of a motor home body 10 is shown. This portion of body 10 includes a roof header member 12, right and left side pillar members 14 and 16, and a sill member 18. Each of these fiber glass body members has a generally U-shaped flange structure 22 along its edge portion which defines an access opening 24 in the rear of the motor home body 10. The flange structure 22, as best seen in FIGS. 2 and 4, provides a recess 26 which opens outwardly and rearwardly of the motor home body 10. The flange structure 22 also includes a portion 28 of thickened cross section inboard of the recess 26. The portion 28 of flange structure 22 has at spaced intervals therealong cut-outs or notches 32. Centrally of each of these notches 32 a hole 34 is provided and an externally threaded steel nut insert 36 is threaded into the hole 34.

A tubular seal 38 of compressible material is inserted in the continuous recess 26 along the body members 12, 14, 16, and 18.

A fiber glass panel 40 is provided for closure of the opening 24. The fiber glass panel 40 has, as best seen in FIGS. 2 and 4, a peripheral flange structure 42 which includes a plurality of flanges 44, 46, and 48 extending laterally of the panel 40 and inwardly of the motor home body 10. These flanges 44, 46, and 48 serve to stiffen the panel 40 from bending. A rib 50 defines an opening in the panel 40 which is closed in a conventional manner by a fixed window glass 52. Lugs or projections 54 are provided along the flange structure 42 of panel 40 at spaced intervals therealong corresponding to the spacing of the notches 32 in the portion 28 of the flange structure 22. When the panel 40 is moved into the position of FIG. 1 closing the opening 24, the projections 54 are received in the notches 32. The interengagement between the projections 54 and notches 32 locates the panel 40 against horizontal and vertical movement within the opening to center the outermost flange 44 of the flange structure 42 within the recess 26 of the flange structure 22. This positive location of the panel 40 relative the body opening prevents the flange 44 from being stressed or bent and thus reduces the possibility of stress cracks in the fiber glass panel 40.

The panel 40 is attached to the flange structure 22 by screws 56 which extend through a central hole 58 in the projections 54 and are threadedly received in the nut inserts 36. As the screws 56 are tightened the projections 54 bottom in the notches 32 and the tubular seal 38 is compressed or deflected as seen in FIG. 2, thereby providing a continuous water-tight seal around the periphery of panel 40. The tubular seal 38 may be compressed to varying degrees along its length as a result of dimensional variances in the various body members and flange structures.

What is claimed is:

1. In a motor home body the combination comprising a roof member, laterally spaced pillar members, and a sill member cooperating to define an access opening in the rear of the body, a first body flange on the members extending substantially continuously about the opening, a second body flange juxtaposed to the first body flange and joined thereto inwardly of the access opening to provide a recess opening outwardly and rearwardly of the body, said second flange including a plurality of spaced notches therein and opening outwardly and rearwardly of the body, a continuous compressable seal received within the recess between the first and second body flanges, a panel for closing the opening in the body, panel flange means on the panel including an outer stiffening flange and inner juxtaposed stiffening flanges extending laterally of the panel and a plurality of spaced projections intermediate the panel stiffening flanges, the outer stiffening flange extending between the first and second body flanges and into compressable sealing engagement with the seal, the plurality of spaced projections of the panel being received within respective spaced notches of the second body flange to positively locate the panel against horizontal and vertical movement within the opening and center the outer stiffening flange between the first and second body flanges and prevent engagement of the outer stiffening flange with the first and second body flanges to thereby prevent stress cracking of said outer stiffening flange, said inner stiffening flange being juxtaposed and in spaced relationship to said second body flange, and removable fastener means extending through the projections of the panel and into the second body flange at the notches thereof to attach the panel to the body and endwise sealingly engage the outer stiffening flange of the panel and the compressable seal.

* * * * *